July 19, 1927.

H. PLOMP

ATTACHING DEVICE

Filed Sept. 16, 1926

1,636,109

Inventor:
Hendrik Plomp
By Emil Bonnelycke
Attorney

Patented July 19, 1927.

1,636,109

UNITED STATES PATENT OFFICE.

HENDRIK PLOMP, OF AMERSFOORT, NETHERLANDS.

ATTACHING DEVICE.

Application filed September 16, 1926, Serial No. 135,953, and in the Netherlands September 11, 1925.

The present invention relates to an attaching device adapted to be used for various attachment purposes. It may, for instance, be employed advantageously in conjunction with an anti-splashing device or mud guard, in which an angular strip of elastic material, such as rubber, is secured to one or to either side of a wheel tire by means of radial arms or other connecting members, which are connected to one or more metal supporting rings.

The attachment serves in this instance for connecting the above mentioned radial arms or other members with the wheel.

The attachment embodying the invention consists in the first place of a casing into which one or more zigzag-shaped or corrugated tongues enter, which tongues, outside the casing, are adapted to be connected with one or more parts to be attached, and inside the casing are clamped or locked in position by means of one or more clamping elements.

Various constructions based on this principle are possible. According to the invention the casing itself may, for example, be provided with the zigzag-shaped or corrugated central member, against opposite sides of which are arranged two correspondingly zigzag-shaped or corrugated tongues, while within the casing means are provided for clamping the two tongues against the central member.

Instead of this duplex arrrangement having two tongues and a cental member, an embodiment may also be used in which only one zigzag-shaped or corrugated tongue enters into the casing and is clamped against the correspondingly zigzag-shaped or corrugated inner side of a wall of the casing.

Furthermore, according to the invention the clamping members may consist of one or more rollers, which are each rotatable about an eccentric axis and which may be flattened, the axis of rotation of the said rollers being parallel to the longitudinal direction of the tongues. The rollers may also be self-locking. According as the double or single tongue construction is used, a pair of clamping rollers or a single clamping roller will be employed.

The invention will be more fully understood with reference to the accompanying drawings illustrating it by way of example.

Figure 1:
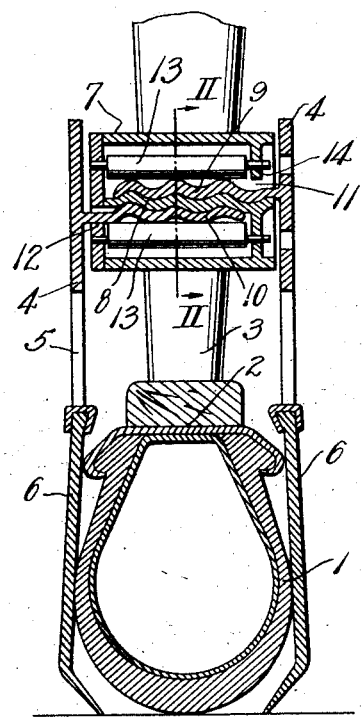
Fig. 1 shows a radial section of a portion of a motor car wheel to which, by means of an attachment according to the invention, lateral angular mud-strips or guards are secured.

In Fig. 1, 1 is a motor car tire mounted on a rim 2, which is connected by means of the spokes 3 to the wheel hub (not shown). Circumferentially of the wheel at a plurality of points between two spokes attaching-devices or connecting-units are arranged, adapted to connect to the wheel angular metal strips 4 provided with radial arms 5, carrying at their outer ends angular rubber mudguards or strips 6. Each attaching device or unit comprises a casing 7, provided with a stationary corrugated central portion or tongue 8. The corrugated upper side of this tongue is engaged by a correspondingly corrugated tongue 9, to which, outside the casing, the right-hand metal strip 4 is connected, while the corrugated lower side of the central tongue is engaged by a correspondingly corrugated tongue 10 on the left-hand metal strip 4. The tongues 9 and 10 may enter into the casing through openings 11 and 12 respectively, provided in the side walls of the casing. Each tongue 9 and 10 may be clamped against the central tongue 8 in the position shown by means of an eccentric roller 13, the geometric axis of which is parallel to the longitudinal direction of the tongues, and the pivot 14 of which is provided with a square end adapted to receive from the exterior of the casing a key for turning the roller into clamping position. Thus the two metal rings 4 are firmly attached to each casing and to each other. The casings or rings are suitably connected to the wheel, as by means of bolts passing through the rings 4, while between the spokes and the rings filling pieces or the like of rubber may be arranged.

Figure 2:
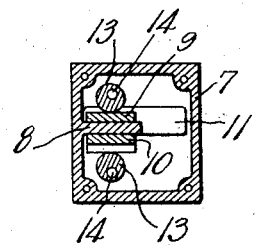
Fig. 2 is a section on the line II—II in Fig. 1.
Figure 3:
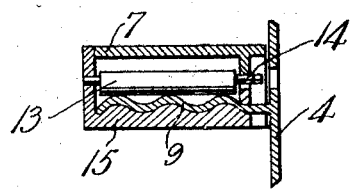
Fig. 3 is a section of a modification of the attaching device which is here of the single tongue type, whereas in Figs. 1 and 2 it is duplex.

In the embodiment according to Fig. 3 the casing 7 of Figs. 1 and 2 is practically divided into equal halves and the corrugated inner side of the lower wall 15 of the casing is engaged by a correspondingly corrugated tongue 9 of a single ring 4, located at one side of the wheel.

It will be clear that the tongues 9 and 10 need not be connected to or made integral with the rings 4. They may also be connected to the radial arms 5 or be made integral with these arms. In general the tongues and the casing may be connected to aribtrary parts to be attached to each other.

I claim:

1. An attaching device, comprising a casing, a corrugated central member disposed within and secured to the casing, a correspondingly corrugated tongue entering into the casing and bearing against one side of the central member, a correspondingly corrugated tongue entering into the casing and bearing against the other side of the central member, and means within the casing for clamping the two tongues against the central member.

2. An attaching device, comprising a casing provided with a corrugated internal surface; an attaching member external to the casing; a tongue rigidly connected to said member and extending into said casing, said tongue having corrugations corresponding to those of said surface to interfit with the same; and means within the casing for clamping said tongue against said surface.

3. An attaching device, comprising a casing provided with a corrugated internal surface; an attaching member external to the casing; a tongue rigidly connected to said member and extending into said casing, said tongue having corrugations corresponding to those of said surface to interfit with the same; and an eccentrically mounted roller within the casing for clamping said tongue against said surface.

4. An attaching device, according to claim 3, in which the axis of the clamping roller is transverse to the direction of extension of the interfitting corrugations.

5. An attaching device, comprisng a casing; an attaching member external thereto; a lateral tongue rigidly secured to said member and projecting into the casing; a member disposed within and rigidly connected to said casing and with which said tongue is directly engaged; and clamping means within the casing for holding said tongue and last-named member in engagement.

6. An attaching device, comprising a casing, an attaching member external thereto; a lateral tongue rigidly secured to said member and projecting into the casing; a member disposed within and rigidly connected to said casing and with which said tongue is directly engaged; and an eccentrically mounted clamping roller within the casing for holding said tongue and last-named member in engagement.

7. An attaching device, comprising a casing; a member disposed centrally within and rigidly attached to the casing; attaching members external to said casing and disposed at opposite sides thereof; a pair of lateral tongues connected to the attaching members and extending into the casing at opposite sides of said central member, said tongues and central member having interengaging parts; and means within the casing for clamping the tongues and central member together with their aforesaid parts in interengaged relation.

In testimony whereof I affix my signature.

HENDRIK PLOMP.